United States Patent [19]
Nystuen et al.

[11] Patent Number: 5,166,568
[45] Date of Patent: Nov. 24, 1992

[54] PSC MOTOR FOR AUTOMATIC WASHER

[75] Inventors: Arne M. Nystuen, Lincoln Township; Edward H. Getz, Pipestone Township; Jeffrey L. Burk, Lincoln Township, all of Berrien County, Mich.

[73] Assignee: Whirlpool Corporation, Benton Harbor, Mich.

[21] Appl. No.: 723,678

[22] Filed: Jun. 27, 1991

Related U.S. Application Data

[63] Continuation of Ser. No. 368,653, Jun. 20, 1989, abandoned.

[51] Int. Cl.$^5$ .............................................. H02K 1/12
[52] U.S. Cl. ................................. 310/254; 310/68 R; 310/179; 310/184; 310/216; 68/12.16; 318/751
[58] Field of Search ................ 310/68 R, 68 A, 68 B, 310/72, 207, 179, 216, 180, 184, 254, 259, 261; 68/12 R, 12.16; 318/751, 752; 336/211

[56] References Cited

U.S. PATENT DOCUMENTS

| | | |
|---|---|---|
| 4,215,303 | 7/1980 | Brimer . |
| 4,232,536 | 11/1980 | Koseki et al. . |
| 4,235,085 | 11/1980 | Torita . |
| 4,288,828 | 9/1981 | Kuntner et al. . |
| 4,289,995 | 9/1981 | Sorber et al. . |
| 4,317,343 | 3/1982 | Gerry . |
| 4,372,134 | 2/1983 | Matsuo . |
| 4,463,302 | 7/1984 | Kirschbaum ......................... 318/751 |
| 4,471,274 | 9/1984 | Ross et al. . |
| 4,473,001 | 9/1984 | Rieger . |
| 4,542,633 | 9/1985 | Hirooka ............................... 68/12 R |
| 4,765,160 | 8/1988 | Yamamoto .......................... 68/12 R |
| 4,772,814 | 9/1988 | Lewus ................................ 310/68 R |
| 4,779,431 | 10/1988 | Burk .................................... 68/134 |
| 4,794,288 | 12/1988 | Lewus ................................ 310/68 R |
| 4,831,301 | 5/1989 | Neumann ........................... 310/184 |
| 4,910,979 | 3/1990 | Burk .................................. 68/23.7 |
| 4,950,969 | 8/1990 | Getz .................................. 68/12 R |
| 4,972,134 | 11/1990 | Getz et al. ......................... 68/12 R |

FOREIGN PATENT DOCUMENTS 2531472  1/1976  Fed. Rep. of Germany ........ 310/72

OTHER PUBLICATIONS

General Electric Application Note 200.35; p. 17, Using the Triac for Control of AC Power; Mar. 1966.
Theory & Design of Small Induction Motors by C. G. Veinot; McGraw Hill Book Co. Inc.; (no month) 1959.

Primary Examiner—R. Skudy
Attorney, Agent, or Firm—Hill, Van Santen, Steadman & Simpson

[57] ABSTRACT

A permanent split capacitor motor and a drive system for an automatic washer including the motor for rotating an agitator in the automatic washer. A control circuit operates the motor in first and second directions. The motor has two stator windings with a turns ratio of approximately 1.0 and a low inertia rotor. The stator bore to outside stator diameter is preferably 0.43.

29 Claims, 6 Drawing Sheets

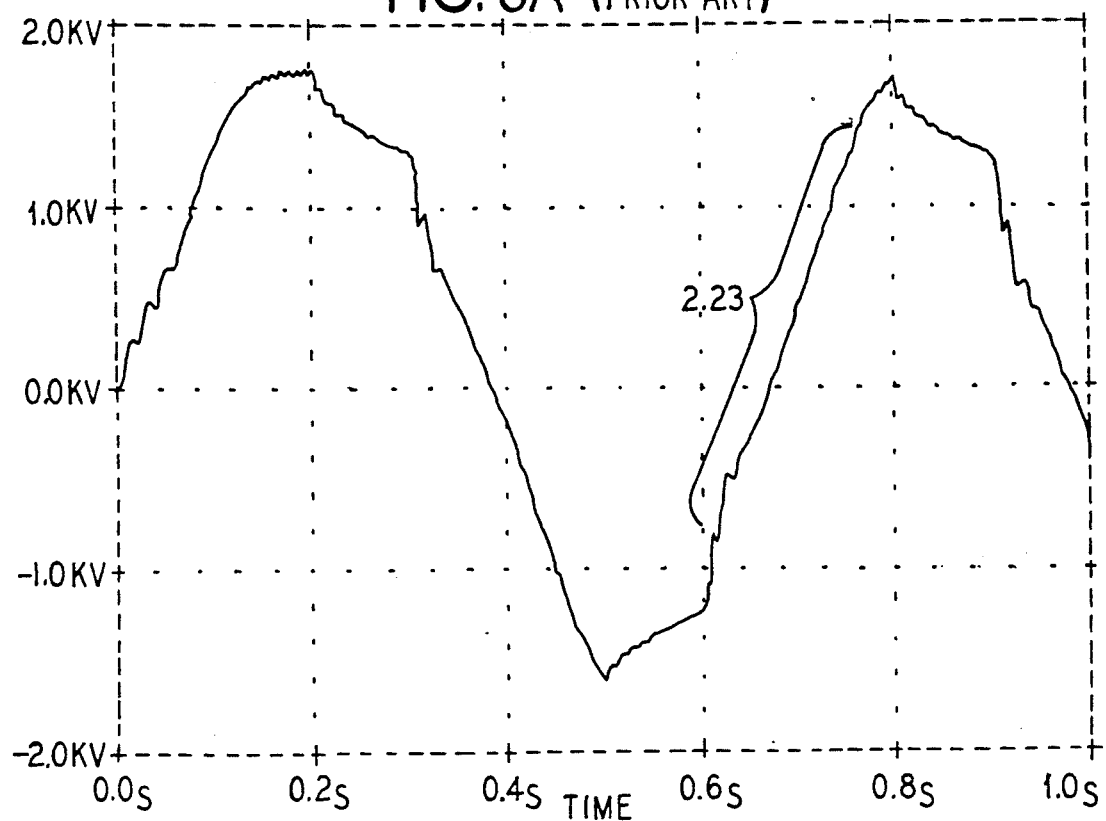
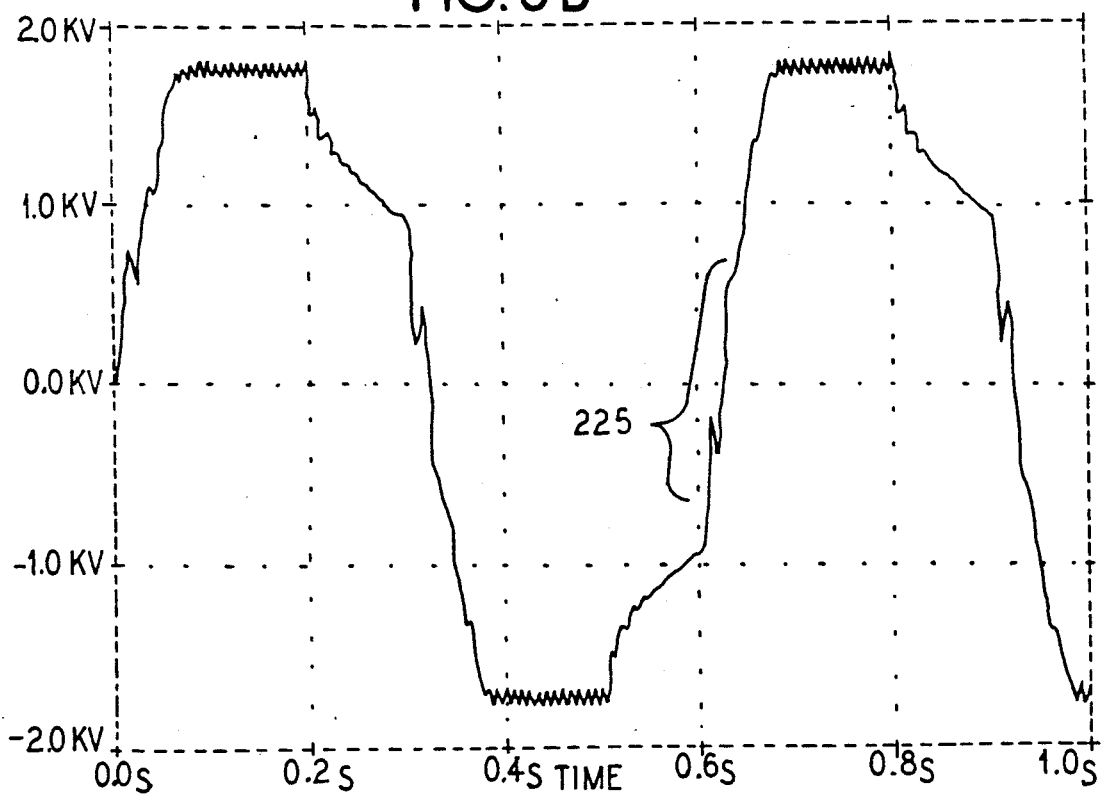

PSC MOTOR FOR AUTOMATIC WASHER

This is a continuation of application Ser. No. 368,653, filed Jun. 20, 1989, abandoned.

BACKGROUND OF THE INVENTION

The present invention relates to an agitator drive system for use in an automatic washer including an alternately reversing drive motor, especially a permanent split capacitor.

In U.S. Pat. No. 4,779,431, a drive system for an automatic washer is disclosed that has a high slip motor connected to a drive reduction mechanism for driving an energy absorbing agitator. The high slip motor is driven with spaced alternating pulses so that the agitator accelerates in one direction and then slows after the end of the pulse followed by an acceleration and then slowing in a second direction so that sinusoidal agitation is produced by a pulse input to the motor. It was found that sinusoidal motion in a washing machine produced improved washing characteristics, with reduced fabric damage. Such agitation motion was previously available only by using relatively large, complex and expensive reversing transmissions.

In U.S. Pat. No. 4,542,633, an agitating drive washing machine is disclosed having an agitating wheel connected to a reversible drive motor by means of a pulley arrangement. The agitating wheel is shown as having short, thick blades. A rotational angle detector is connected to a control that causes the motor, which is described as having rigidity, to rotate the agitating wheel about a predetermined angle. Upon reaching the predetermined angle, the motor is not energized until the agitator wheel has stopped, at which time the motor is operated in a reverse direction to again rotate the agitator wheel about the predetermined angle.

An automatic washer manufactured by an assignee of U.S. Pat. No. 4,542,633, and appearing to incorporate the teachings of that patent, has been observed to have an agitator stroke angle of approximately 360° for each stroke at a rate of 70 strokes per minute. A high rigidity motor causes a nearly constant agitator speed in each rotational direction following a brief, rapid acceleration, and followed by the coasting to stop action.

Thus, automatic washer drive systems having reversing motors for producing a generally square wave agitation curve are known. An agitation curve is defined herein as the rotational speed of the agitator over time. A square wave agitation curve is thus a constant speed in one direction followed by a constant speed in the opposite rotational direction. Correspondingly, a sinusoidal agitation curve would result from a gradual acceleration followed immediately by a gradual deceleration of the agitator in each rotational direction.

In U.S. Pat. No. 3,315,500 to Brundage et al., a mechanism is provided as a drive system for an agitator using a motor operating at a constant speed in one direction to drive a hydraulic transmission which provides very rapid reversal of the agitator through a reversing valve and, thus, is a square wave type agitation motor. An elastic coupling is used between the agitator and the agitator drive shaft to reduce the shock which would otherwise be delivered to the agitator at each reversal.

An automatic washer having an axial air gap induction motor is disclosed in U.S. Pat. No. 4,232,536. The motor is repeatedly reversed to oscillate a vertical axis agitator through a planetary drive coupled therebetween, the motor being operated at high speeds. The desirability of providing a soft starting action of the agitator each time it reverses is recognized, the soft starting action being provided by the backlash associated with the planetary drive mechanism.

The appliances disclosed in the above-cited references demonstrate the importance of the type of motor used. The motors employed greatly influence the quality of operation of these appliances.

A properly designed permanent split capacitor (PSC) motor has many characteristics which make it ideal for a continuously reversing application, such as in an automatic washer. It does not require a starting switch, full load efficiency is 70%, the ratio of starting to breakdown torque is about 0.6, electronics could be added to extend performance capability, and it is inherently shorter in axial length than other motor types. Its reliability and many years of existence makes this a very low risk motor for this application.

Permanent split capacitor motors and the design thereof are well known in the prior art. Typically, the run and auxiliary windings are wound in space pole quadrature, i.e., 90 electrical degrees with respect to each other; the former is usually wound first, and then the latter is wound on top of it with a different number of turns and wire size. The rotor is of the usual squirrel cage construction.

The design parameters of prior art permanent split capacitor motors is well established and any significant deviation from these parameters is considered to result in motors which function poorly. For example, the ratio of the stator bore, $D_1$, to the outside diameter of the stator is approximately 0.6 for a four pole motor. The well-known empirical formula for establishing a value for this ratio, where P is the number of poles, is:

$$D_1 = \frac{D - 0.647}{1.175 + \frac{1.03}{P}}$$

Also, for maximum efficiency at the load point, the motor should have a turns ratio in the range 1.5 to 2.5.

FIG. 7A shows the speed-torque curves for a prior art reversing motor in which curve 201 is for one direction of rotation and curve 203 is for an opposite direction of rotation. The load line 205 intersects both curves 201 and 203 as shown. If the motor winding is reversed at point 207, the system will follow curve 205 to point 209 where it will stabilize instead of reversing. The present invention overcomes this drawback in the prior art. Instead, the curves 201 and 203 are a function of the turns ratio of the windings.

An excellent summary of the design and operational parameters of prior art permanent split capacitor motors is found in "Theory and Design of Small Induction Motors" by Cyril G. Veinott, published by McGraw Hill Book Company, Inc. in 1959.

In a continuously reversing application of the permanent split capacitor motor, it is necessary to greatly increase the size of the motor to achieve rapid acceleration under load. However, it has been found that large increases in physical motor size produce only small increases in motor performance. This is because most of the increase in torque is used to turn the rotor which has increased inertia. Again, the present invention overcomes this drawback in the prior art.

SUMMARY OF THE INVENTION

A drive system for an automatic washer including a permanent split capacitor motor for rotating an agitator in the automatic washer. A control circuit operates the motor in a first and a second direction. The motor has two stator windings with a turns ratio of approximately 1.0 and a low inertia rotor. The ratio of stator bore to outside stator diameter is approximately 0.43.

The motor operates according to a speed torque curve along a first curve $T_1$ for the first direction of rotation to an intersection with a load line $T_3$ and operates according to a torque curve $T_2$ for the second direction of rotation. For all values of speed in a first quadrant, $T_3$ minus $T_2$ is greater than zero. For a second quadrant, where $T_2$ is less than zero, $T_3$ minus $T_2$ is greater than zero for all positive values of $T_3$.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like references numerals identify like elements, and in which:

FIG. 8A is a graph depicting acceleration in a reversing prior art motor.

FIG. 8B is a graph depicting acceleration in a PSC motor constructed according to the present invention.

DESCRIPTION OF THE PREFERRED EMBODIMENTS

The present invention of a novel PSC motor has general applicability and can be used in a variety of applications. One such application is for operating an automatic washer.

Figure 1:
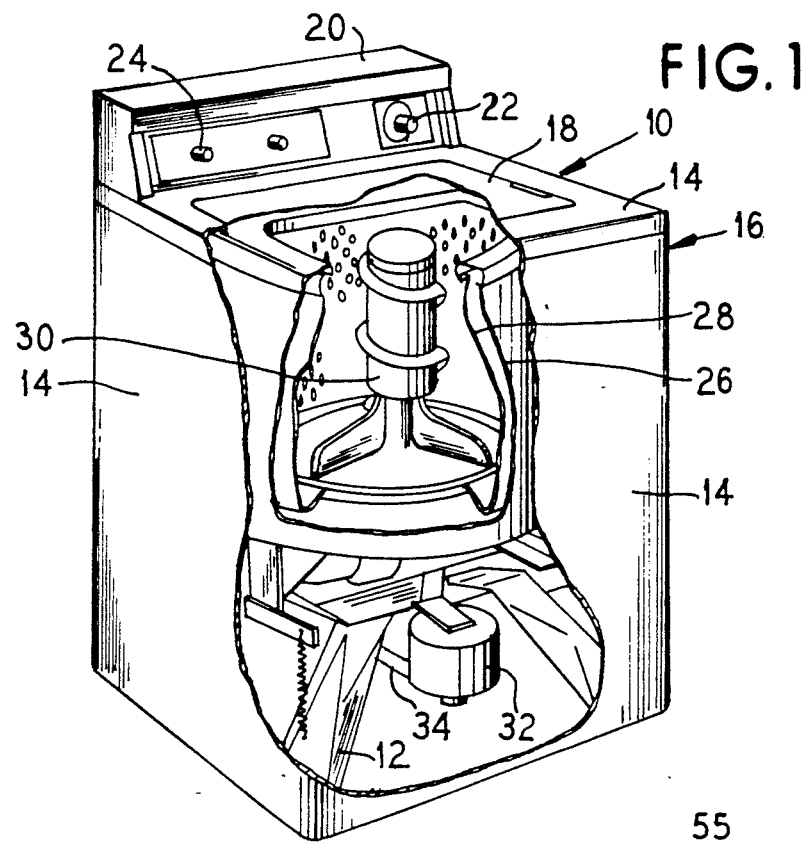
FIG. 1 is a perspective view partially cut away depicting an automatic washer utilizing the present invention.

In FIG. 1, reference numeral 10 indicates generally a vertical axis agitator type washing machine having presettable controls for automatically operating the machine through a programmed series of washing, rinsing, and spinning steps. The machine includes a frame 12, carrying panels 14 forming the sides, top, front, and back of a cabinet 16. A hinged lid 18 is provided in the usual manner for access to the interior of the washing machine 10. The washing machine 10 has a rear console 20 in which is disposed manually settable control means, including a timer dial 22 and a temperature selector 24.

Internally of the washing machine 10 there is disposed an imperforate fluid containing tub 26 within which is rotatably mounted a perforate basket 28 for rotation about a vertical axis. A vertically disposed agitator 30 is connected for operation to a motor 32 through a drive mechanism 34.

Figure 2:
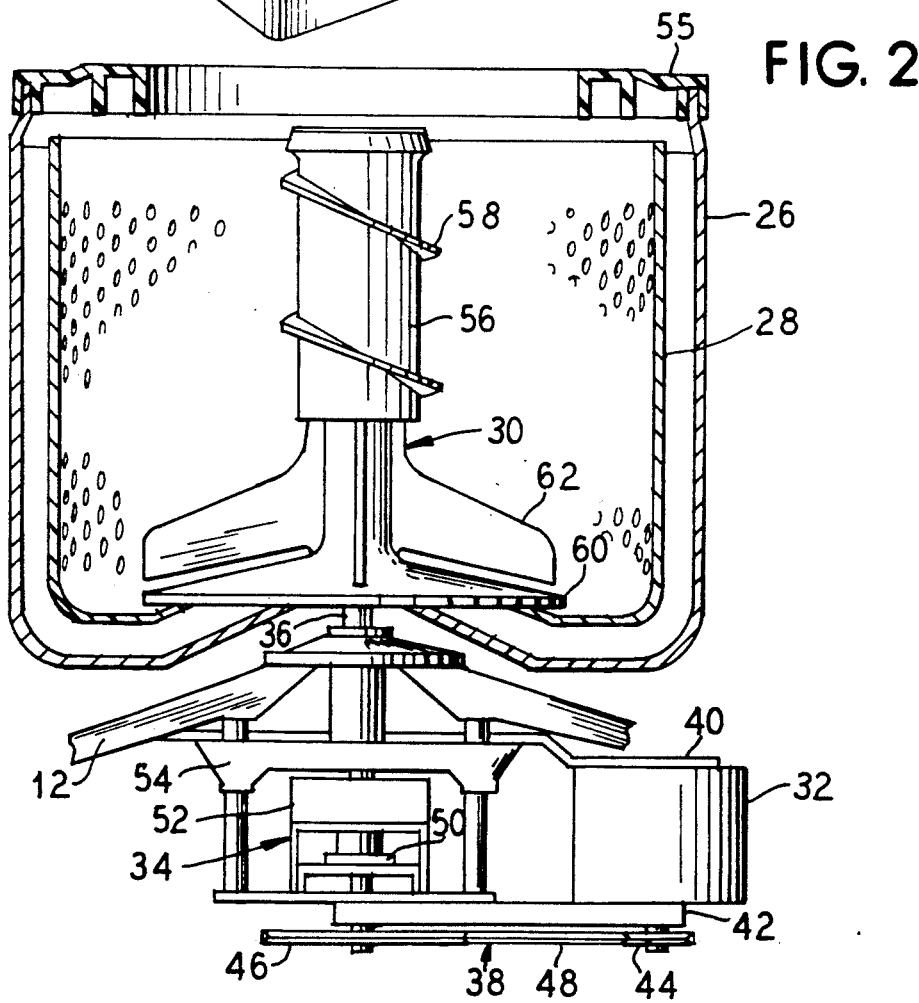
FIG. 2 is a cross-sectional view of a portion of the FIG. 1 automatic washer.

Referring to FIG. 2, the agitator 30 is linked by a shaft 36 to the reduction drive 34, which in turn is driven through a pulley arrangement 38 by the motor 32. The motor 32 is a high slippage motor and preferably a permanent split-capacitance (PSC) motor which has a low start torque relative to its breakdown torque to provide a soft start of the agitator. The PSC motor 32 also has a relatively flat load curve above the breakdown point so that steady state speed will not vary greatly with load. The motor 32 is mounted in a bracket arrangement 40 and 42 which connects to the frame 12 of the washer 10.

The motor 32 is linked by the pulley arrangement 38, including a drive pulley 44 and a driven pulley 46 connected by a belt 48, to the reduction drive 34. The reduction drive 34, in one embodiment, is a planetary gear drive which includes a spring clutch 50 and a planetary housing 52 mounted in a reduction drive frame 54 that connects to the frame 12 of the washer 10. Although a planetary reduction drive is disclosed herein for use with the present invention, it is also contemplated that a variety of other reduction drive arrangements could be utilized as is known to those skilled in the art. It is also contemplated to eliminate the reduction drive and link the agitator directly to an appropriately selected motor.

The shaft 36 extends upwardly from the reduction drive 34 through the tub 26 and the perforate basket 28 and connects to the agitator 30. A tub ring 55 extends around the top of tub 26. The agitator 30 is a dual action agitator having an upper barrel 56 with helical vanes 58, as well as a lower agitator portion 60 from which extends a plurality of flexible vanes 62. The flexible vanes 62 enable the agitator 30 to absorb energy as the direction of rotation is reversed, while still coupling the agitator 30 to the load provided by water within the tub 26, as well as any articles of clothing therein. This coupling between the agitator and the clothes and water loads the motor to cause the speed to increase slowly. The flexible vanes provide a more uniform load coupling and torque over the angular range of the stroke over a range of clothes load sizes. The flexibility of the vanes 62 also prevents the impact loading at the beginning of the stroke from exceeding the locked rotor torque of the motor 32.

Figure 3:
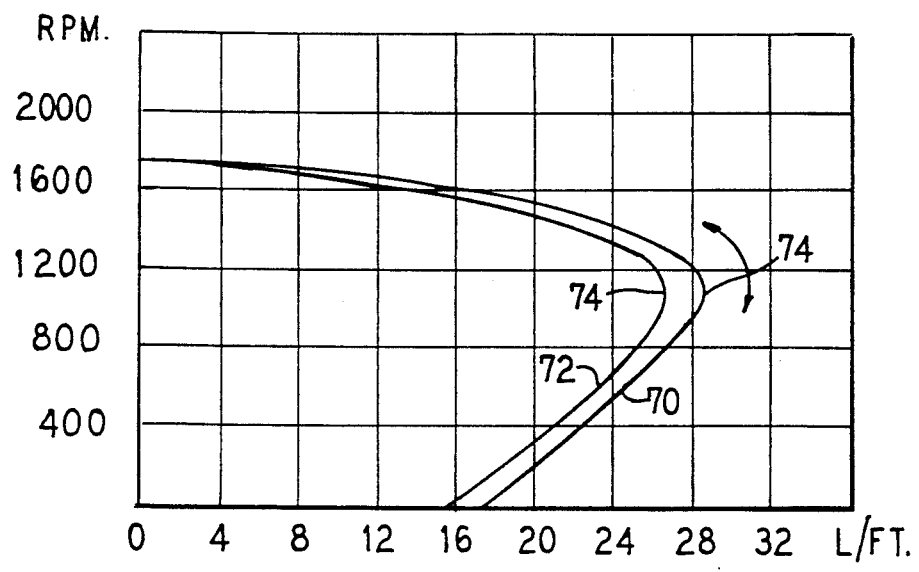
FIG. 3 is a general graph of a torque vs. speed diagram for a permanent split capacitor motor used in the FIG. 1 washing machine.

General torque/speed characteristics of the PSC motor 32 are shown in FIG. 3. The torque/speed curve is plotted at 70 for a first direction of operation and the curve 72 shows the torque/speed characteristic in an opposite direction. As discussed above the motor 32 has a low torque at slow speeds, and a relatively flat curve about a breakover or breakdown point 74 as indicated by the rightmost portion of the curve having the highest torque value. It can be seen that the PSC motor 32 is operating primarily on the start-up portion of the torque/speed curve.

Figure 4:
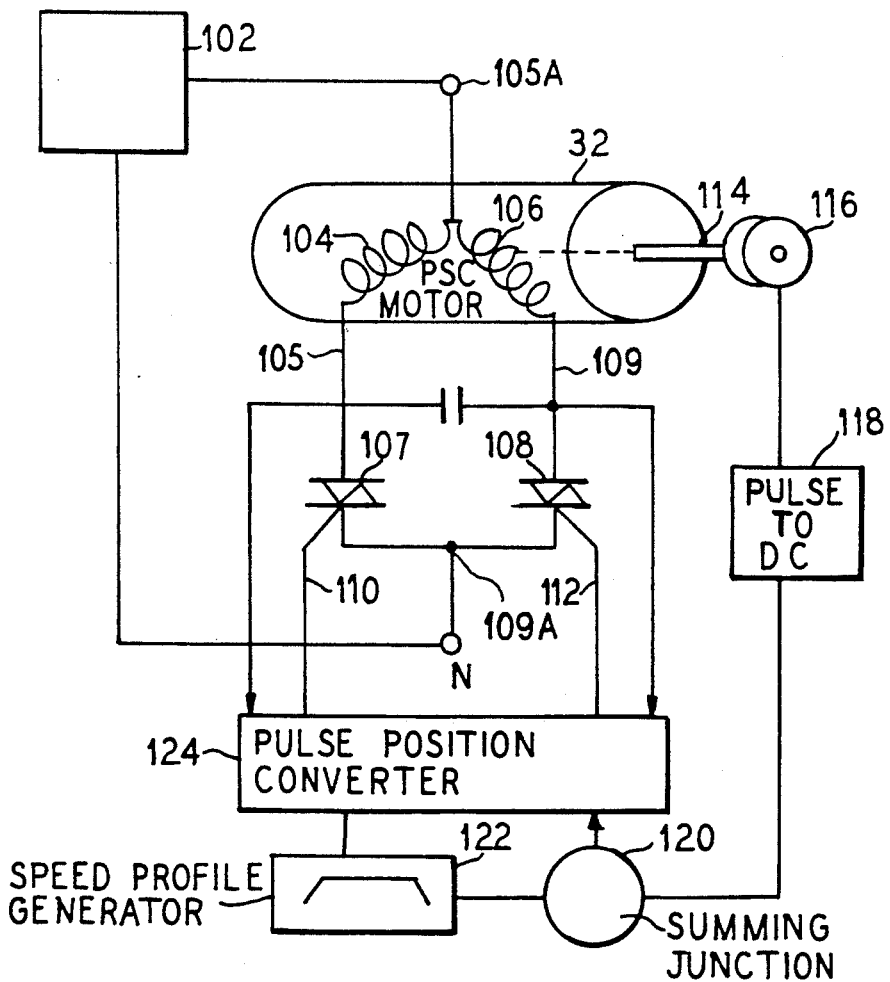
FIG. 4 is a general block diagram of a control circuit for use with the permanent split capacitor motor.

Referring now to FIG. 4, in which is illustrated the control circuit of the permanent split capacitor motor 32, the motor 32 is connected to an alternating power source 102 which supplies AC voltage and current at the proper frequency and amplitude for operating the motor 32. The motor 32 includes a pair of stator windings 104 and 106. These windings 104 and 106 are connected such that one winding is a run winding and the other is an auxiliary winding. A pair of switches 107 and 108 determine which of the windings 104 and 106 are to be the run and auxiliary windings. By way of example, the switches 107 and 108 may be triacs as shown in FIG. 4, the triacs 107 and 108 having control electrodes 110 and 112 respectively.

Other types of bidirectional switch means may be used in place of the triacs 107 and 108, as for instance mechanical switches or relays. However, the use of triacs allows relatively precise control at the point at which the windings are energized.

As illustrated in FIG. 4, the windings 104 and 106 and switches 107 and 108 are coupled together such that two parallel lines 105 and 109 are formed. As illustrated, winding 104 and switch 107 are connected to form a stator run winding line 105 wherein the stator run winding 104 is coupled in series with the switch 107 while winding 106 and switch 108 are connected to form a stator auxiliary winding line 109 wherein the auxiliary winding 106 is coupled in series with the switch 108. The lines 105 and 109 are connected in parallel between terminals 105A and 109A.

Using the motor and switching arrangement of FIG. 4 a rapid reversal of the motor 32 may be effected by energizing the windings 104 and 106. However, superior performance of an automatic washing machine can be attained by energizing the PSC motor 32 according to a velocity profile, that is, for example, accelerating a motor for a predetermined length of time, running the motor at a constant rate and then finally decelerating the motor until it reaches approximately a zero velocity, at which time the motor 32 is reversed by changing the switches 107. The velocity profile used to operate the motor in each direction as applied to each of the windings 104 and 106 can take any of a variety of shapes depending upon the application.

As shown in FIG. 4, a shaft 114 of the motor 32 is connected to a tachometer 116 which outputs a signal indicative of the speed of the motor 32. A pulse to dc circuit 118 converts this signal to a dc level which is applied to a summing junction 120. Also supplied to the summing junction 120 is the velocity profile signal from the velocity profile generator 122. The velocity profile generator 122 also supplies a direction signal which is utilized by the pulse position converter 124. The pulse position converter 124 also receives an error signal from the summing junction 120 and then, based on this information, applies a pulse signal to the appropriate triac during a certain phase angle of the ac current supplied from the ac power source 102 to determine the amount of power applied to the motor 32. As is well known, the triac after having been gated on, will remain on until the next zero crossing of the ac current through the motor 32. It is to be understood that other types of control circuits can be used with the novel PSC motor of the present invention, the FIG. 4 circuit being just one example.

Figure 5:
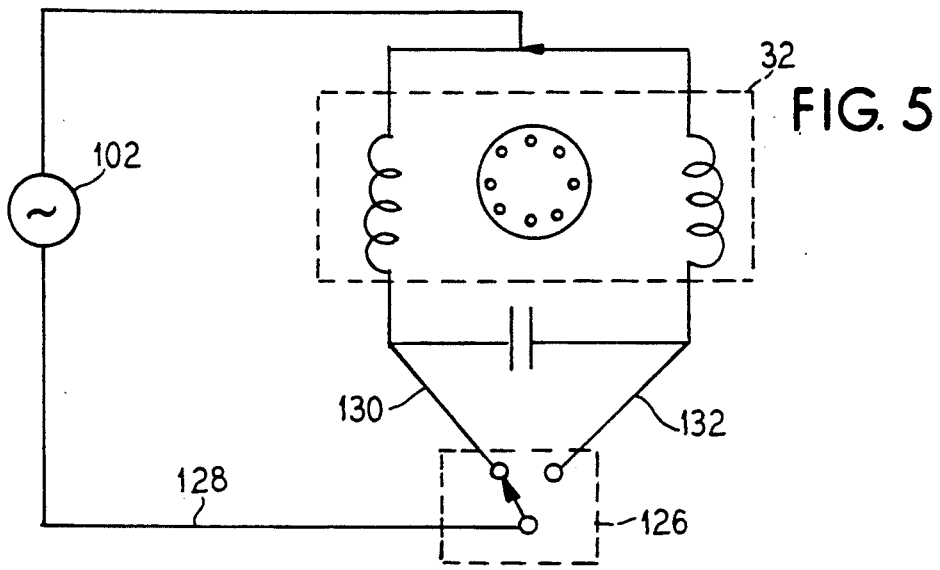
FIG. 5 is a block diagram of the control circuit and the permanent split capacitor motor.

FIG. 5 shows a general block diagram of the present invention. The PSC motor 32 is energized from the ac source 102. The reversing triac drive 126 connects the ac source line 128 to either line 130 or 132 depending upon the direction of rotation selected for the PSC motor 32.

The PSC motor 32 as shown in FIG. 5 has many characteristics which make it ideal for a continuously reversing application, such as for use in driving the agitator of an automatic washer. For example, it does not require a starting switch and has full load efficiency of about 70–80%. The ratio of starting to breakdown torque is about 0.6. Also of importance is the fact that the PSC motor is inherently shorter in axial length than other motor types.

Figure 6:
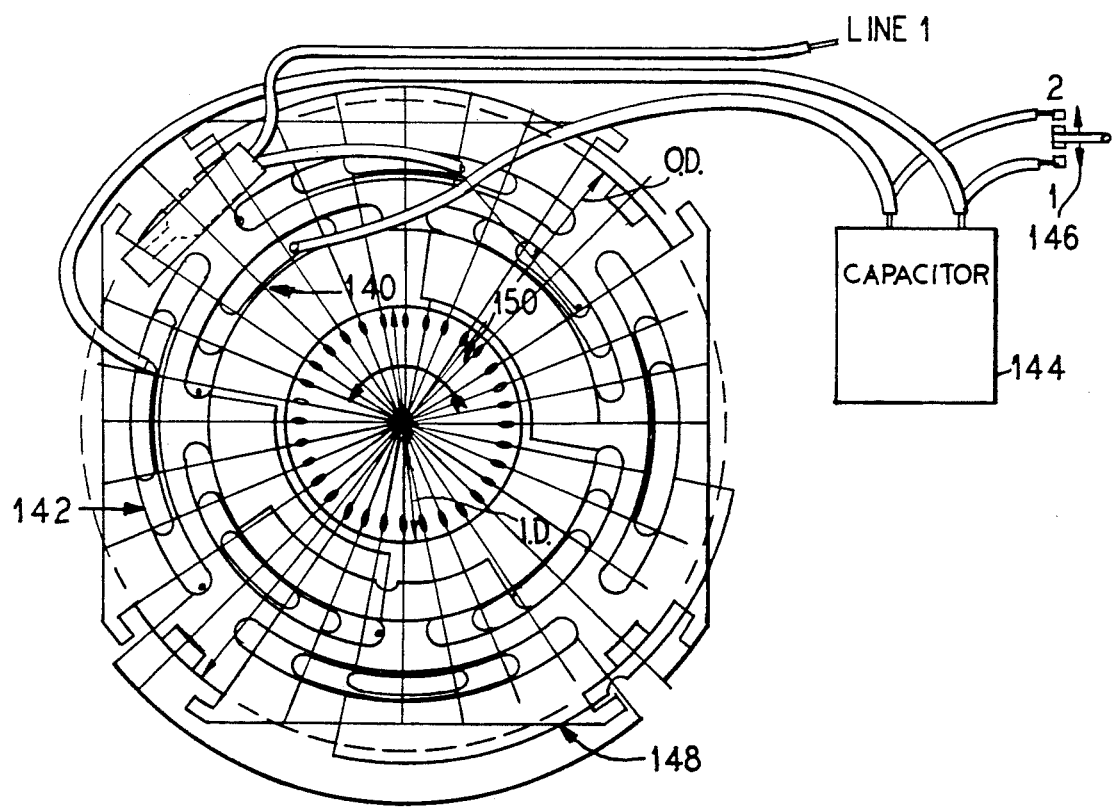
FIG. 6 is a schematic drawing of the permanent split capacitor motor.

Two requirements are necessary to develop a revolving flux field in a PSC induction motor from standstill position of the PSC motor. The auxiliary winding must be physically displaced by approximately 360°/2P where P is the number of poles, from the main winding. For example, in a 4 pole motor it preferably is displaced by 45 degrees from the main winding. Furthermore, the auxiliary winding must have an electrical phase shift of approximately 360°/P, (for example, preferably 90 degrees for a 4 pole motor) with respect to the main winding. Such a 4 pole PSC motor is shown in FIG. 6 wherein the auxiliary winding 140 is displaced 45 mechanical degrees from the main winding 142 and a capacitor 144 is used to shift the phase voltage in the auxiliary winding 140 when the switch 146 is in position 1 as shown. The cross product of the resulting rotating flux produced by the stator windings of the stator 148 and the induced current in the rotor cage 150 produce motor torque. Also illustrated in an inside diameter I.D. and an outside diameter O.D. of the stator of the PSC motor.

As previously stated, the design of prior art PSC motors required that a turns ratio of stator run winding to stator auxiliary winding for maximum efficiency at the load point be typically in the range of 1.5 to 2.5 and that the capacitive reactance be chosen to be equal to the main winding open circuit reactance times the turns ratio squared. However, this type of PSC motor can cause certain problems in operating an automatic washer. These established relationships do not suit the requirements of an automatic washer because they result in different speed torque characteristics in each direction of rotation, unbalanced agitator movement, and clothes tangling. For example, torque in the first quadrant of the speed torque curve causes the rotor to continue in the same direction after the reversing switch is activated.

The novel PSC motor according to the present invention overcomes this problem in the prior art by having a stator turns ratio of approximately 1.0 and a capacitive reactance equal to 1.5 times the main winding open circuit reactance. The capacitor reactance should be in the range 1.25 to 1.75 times the main winding open circuit resistance. In the preferred embodiment, the slot reactance of the PSC motor is taken into account by changing the turns ratio of the stator windings from 1.0 to 1.04.

Figure 7A:
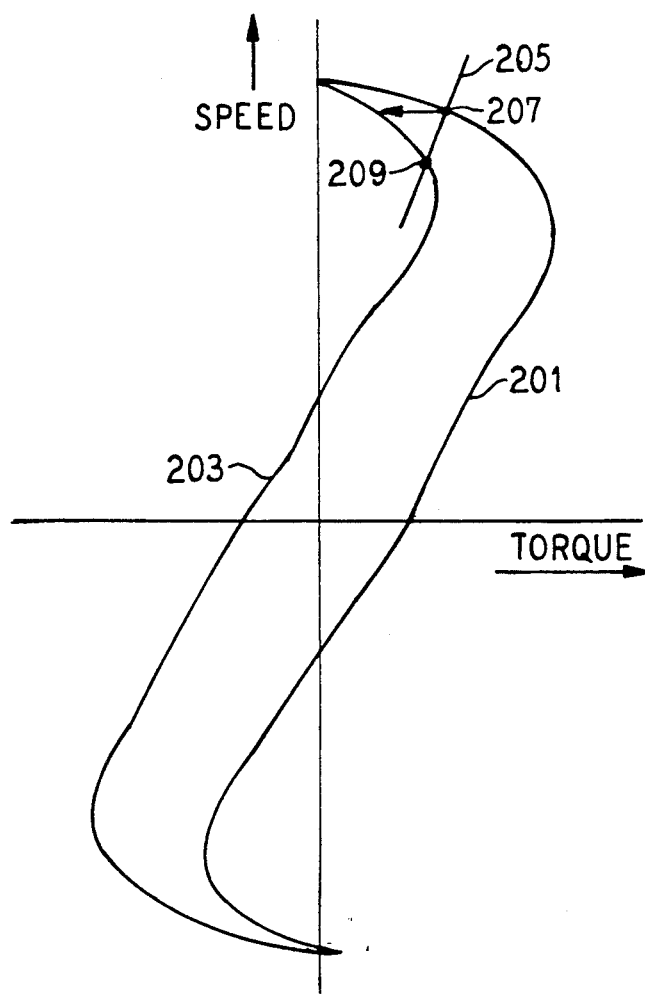
FIG. 7A is a torque/speed curve for a prior art motor.

A typical prior art speed curve is shown in FIG. 7A. It is known in the prior art that a single phase induction motor should have the same general torque characteristics as two polyphase motors of equal rating, mechanically coupled and connected for opposite directions of rotation. This results in the curves of FIG. 7A. When the motor is rotating in one direction, it operates according to a first speed vs. torque curve $T_1$ shown at 201. The motor operates according to a second speed vs. torque curve $T_2$ shown at 203 when rotating in the opposite direction. In operation, as is well known in the art, the motor accelerates to a steady state speed determined by the interjection of the product load line $T_3$, shown at 205, and the curves $T_1$ and $T_2$. The product load line $T_3$ shown at 205 is one example wherein reversing the motor winding operating at point 207 results in stable but not reversed operation of the motor at point 209.

It has been determined that if the torque value on the product load line $T_3$ minus the speed vs. torque value on the motor torque curve $T_2$ is greater than zero in the first quadrant (that is, the curves $T_3$ and $T_2$ do not intersect) for all values of speed then successful reversal of the motor will occur. This condition can be satisfied by designing the motor such that for all positive values of $T_3$, $T_2$ is less than zero. That is, the motor is preferably designed such that the reverse motor speed vs. torque curve $T_2$ is located exclusively in the second quadrant as shown in FIG. 7B.

Figure 7B:
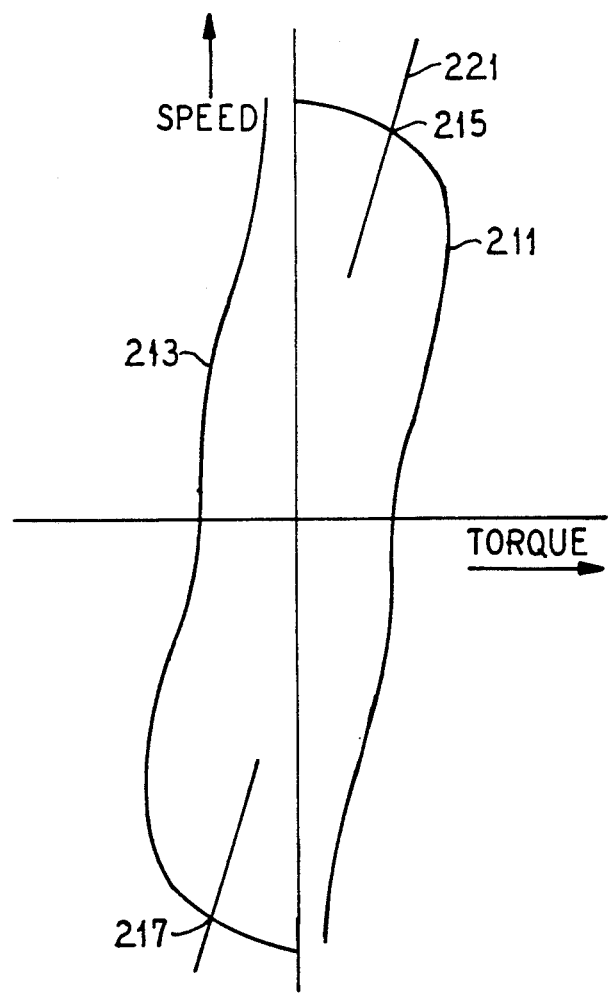
FIG. 7B is a torque/speed curve for a PSC motor constructed according to the present invention.

The novel single phase PSC motor of the present invention, produces the novel speed vs. torque curves $T_1$ and $T_2$ shown at 211 and 213 respectively, in FIG. 7B. Since the curve $T_2$ at 213 is always in the second quadrant as shown, the PSC motor after reversal from point 215 on the load curve $T_3$, shown at 221, will accelerate to point 217, where it will be in equilibrium. It is important to note that if the ratio of the windings in the PSC motor is 1.0, then the curves 211 and 213 will not be exactly symmetrical. This is because one winding must be wound on top of the other winding in the slots of the motor. Therefore, it has been found that a turns ratio of the stator windings of 1.04 provides the proper symmetry of the curves 211 and 213. Further, FIG. 7B shows third and fourth quadrants.

As illustrated in FIG. 7B, for all positive and negative values of speed, the torque values on the reverse speed vs. torque curve $T_2$ are less than zero, i.e., the curve $T_2$ at 213 is located in the second quadrant.

Agitator acceleration is an important element in developing the proper wash load rollover and washing action. The motor torque, therefore, must be sufficient to provide the required acceleration of the agitator. It is known in the prior art that to increase output torque a PSC motor size is to be increased in both its diameter and length. However, the PSC motor of the present invention achieves an increase in output torque without using the prior art approach. An analysis of the motor/machine dynamics revealed that over 75% of the motor torque is consumed in accelerating the mass of the rotor. This analysis also shows that when the size of the motor is increased to develop more torque, rotor inertia is sufficiently increased to significantly negate the added torque. As will be explained in detail below, rotor inertia is a function of the diameter to the fourth power, and therefore, it was determined that a radical deviation from the prior art approach of the design ratio of stator bore to outside stator diameter was necessary. By reducing the ratio of the bore to the outside diameter from 0.6 to 0.43, (0.6 being the prior art as described above) and adding additional length to maintain the torque, the inertia and torque required to accelerate the rotor was reduced by a factor of 2.8.

For example, the computer simulation of FIG. 8A of a prior art motor having a large diameter shows an acceleration of the motor at 223 being 1570 rad/sec$_2$. As shown in the computer simulation of FIG. 8B the novel PSC motor of the present invention which has a much smaller diameter has an acceleration at 225 of 2736 rad/sec$^2$. Less time necessary for acceleration is an important consideration, since this is an area where induction motors are not efficient.

Figure 9:
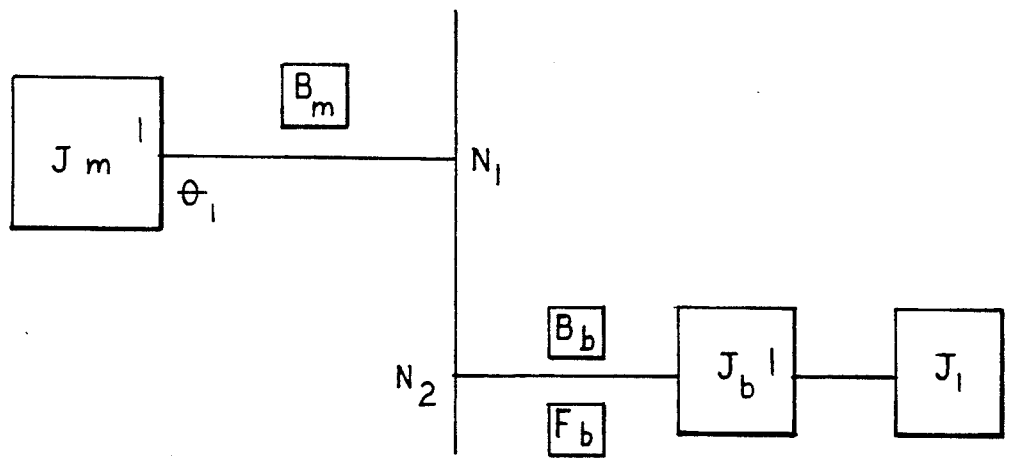
FIGS. 9 and 10 are diagrams depicting the dynamics of the FIG. 1 automatic washer.
Figure 10:
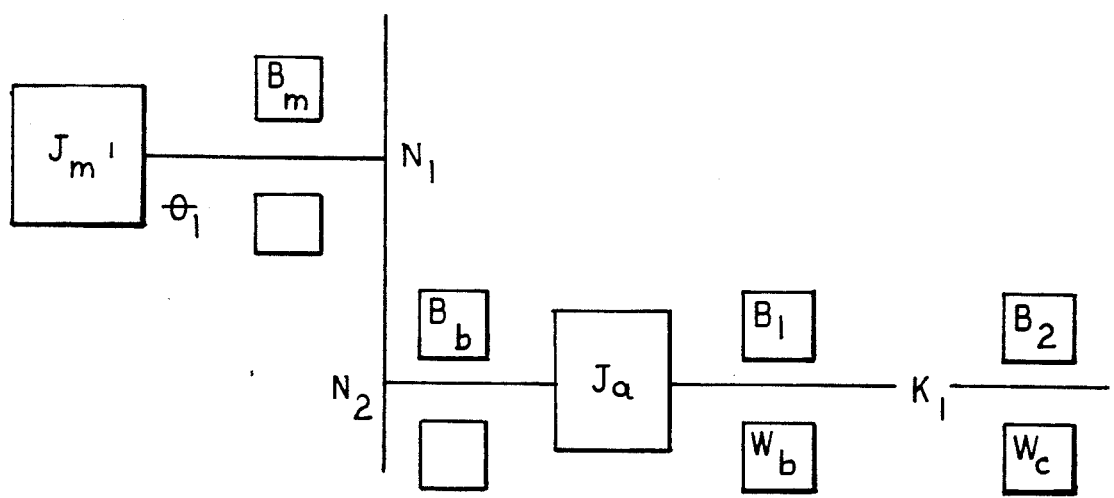

In reference to FIG. 9, the following equations show the relationship of the motor torque for a spin mode of the washer shown in FIGS. 1 and 2 and in reference to FIG. 10 the following shows the agitation mode for the washer shown in FIGS. 1 and 2.

$$T(t) = J_m' \frac{d^2\theta_1(t)}{dt^2} + B_m \frac{d\theta_1(t)}{dt} + \frac{N_1^2}{N_2} (J_b' + J_1) \frac{d^2\theta_1(t)}{dt^2} +$$

$$\frac{N_1^2}{N_2} B_b \frac{d\theta_1(t)}{dt} + \frac{N_1}{N_2} F_b \frac{d\theta_1(t)}{|d\theta_1|}$$

SPIN MODE

Where:
$J_m'$ = Total drive inertia = $J_m + J_d$
$J_m$ = Motor inertia = $45 \times 10^{-3}$ N·m·sec$^2$
$J_d$ = Pulley = $.037 \times 10^{-3}$ N·m·sec$^2$
$B_m$ = Drive friction = $1.9 \times 10^{-3}$ N·m/RPS
$J_b'$ = Machine inertia = $J_b + J_a + J_s$
$J_b$ = Basket inertia = $.375$ N·m·sec$^2$
$J_a$ = Agitator inertia = $.0088$ N·m·sec$^2$ (includes $9 \times 10^4$ N·m·sec$^2$ Pulley)
$J_s$ = Spin Tube = $.001$ N·m·sec$^2$
$J_1$ = Inertia of load
  = $.035 \times L$ (dry lbs. of clothing in wet condition)
$N_1/N_2$ = Gear Ratio = $\frac{1}{2.6}$
$B_b$ = Viscous Friction = $12.3 \times 10^{-3}$ N·m/RPS
$F_b$ = Coulomb Friction = $2.26$ N·m

AGITATION MODE

Where:
$J_m'$ = Total drive inertia = $J_m + J_d$
$J_m$ = Motor inertia = $.45 \times 10^{-3}$ N·m·sec$^2$
$J_d$ = Pulley = $.037 \times 10^{-3}$ N·m·sec$^2$
$B_m$ = Drive Friction = $.0019$ N·m/RPS
$J_a$ = Agitator inertia = $.0088$ N·m·sec$^2$ (includes $9 \times 10^{-4}$ N·m·sec$^2$ Pulley)
$N_1/N_2$ = Gear Ratio = $\frac{1}{11.43}$
$B_b$ = Transmission Viscous Friction = $.0123$ N·m/RPS
$B_1$ = Load Viscous Friction = $.06$ N·m/RPS
$K_1$ = Spring Constant = $2 + .34 \times$ Load (lb.) (N·m/rad)
$B_2$ = Clothing to Basket Viscous Friction = $40$ N·m/RPS The following are specifications for one embodiment of a PSC motor constructed according to the present invention.

A prototype motor has been found to deliver the desired performance characteristics for an automatic washer. The prototype motor delivers this performance at 120 volts, 60 Hz with a 45 mfd capacitor.

To obtain an acceptable agitation velocity profile, the rotor inertia must be related to the motor pull-up torque. A prototype motor has the following inertias:

| | |
|---|---|
| Rotor, shaft and bearing inner race | $.45 \times 10^{-3}$ N.m.sec$^2$ |
| Fan and Pulley | $.037 \times 10^{-3}$ N.m.sec$^2$ |
| TOTAL | $.487 \times 10^{-3}$ N.m.Sec$^2$ |

Other ratios may be acceptable.
Prototype design is as follows:
Main winding—33-66 #22
Auxiliary winding—33-66 #22
Rotor—34 slots, 2.4 inches O.D.
Stator—24 slots, 5.5 inches O.D.
Stack (axial length of laminations)—1.53 inches
X—5.724/6.36
$X_o$—42.55/47.7
$R_2$—9.3
Iron Loss—31.9/42
Bearings—Double Ball Provisions should be made for an internal shaft mounted fan to provide cooling for the windings. A single radial fan located opposite the shaft end in close proximity of the windings will be adequate. Vent holes should be provided in the end bracket to pass axial inlet air and radial exhaust air.

Thus, it can be seen that the novel PSC motor constructed according to the present invention provides the operation according to the speed torque curve shown in FIG. 7B and utilizes a substantially one-to-one ratio for the windings and in addition, utilizes a low inertia rotor having a smaller diameter and longer length than prior art PSC motors. It can be appreciated that the PSC motor of the present invention radically departs from accepted practices of PSC motor design.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. A continuously reversible permanent split capacitor motor comprising:
    a rotor having a predetermined outer diameter;
    a stator having a predetermined bore diameter and a predetermined outer diameter such that a stator ratio defined as said bore diameter divided by said outer diameter of said stator is about 0.43;
    a stator run winding line having a stator run winding with a first predetermined number of turns coupled in series with a first switch; and
    a stator auxiliary winding line coupled in parallel to said run winding line and having a stator auxiliary winding with a second predetermined number of turns coupled in series with a second switch, said first and second number of turns being approximately equal.

2. The motor of claim 1, wherein said motor has a capacitive reactance which is in the range 1.25 to 1.75 times a main winding open circuit reactance.

3. The motor of claim 1, wherein a winding ratio is about 1.04.

4. The motor of claim 1, wherein said permanent split capacitor motor has a first torque/speed curve for one direction of rotation of said motor and a second torque/speed curve for an opposite direction of rotation of said motor, said first torque/speed curve being substantially an inverted mirror image of said second torque speed curve.

5. The motor of claim 4, wherein said first torque speed curve lies substantially in a first and fourth quadrant and said second torque speed curve lies substantially in a second and third quadrant.

6. The motor of claim 4, wherein for operation of said permanent split capacitor motor characterized by a load line intersecting said first torque speed curve in a first quadrant and for all values of speed in said first quadrant, for all points the value of a load line less the value of said second torque speed curve is always greater than zero.

7. A drive system for an automatic washer having an agitator mounted within a wash tub, comprising:
    a continuously reversible low inertia permanent split capacitor motor mounted within the automatic washer, said motor being operable according to a speed versus torque curve $T_1$ for a first direction and to a speed versus torque curve $T_2$ for a second direction, said speed versus torque curves $T_1$ and $T_2$ being plotted on a two dimensional graph of speed versus torque wherein a horizontal axis is torque and a vertical axis is speed, said motor comprising: a rotor, a stator having a predetermined bore diameter and a predetermined outer diameter such that a stator ratio defined as said bore diameter divided by said outer diameter of said stator is about 0.43, a stator run winding line having a stator run winding with a first predetermined number of turns coupled in series with a first switch, and a stator auxiliary winding line coupled in parallel to said run winding line and having a stator auxiliary winding with a second predetermined number of turns coupled in series with a second switch, said first and second predetermined numbers of turns being approximately equal;
    a drive means linking said motor to rotate the agitator and presenting a predetermined product load line $T_3$ on said graph to said motor;
    a control circuit connected to operate said motor in first and second opposite directions, the control circuit including means for alternating motor operation in the first and second opposite directions; and
    said directions being such that for any positive value of speed corresponding value of torque on said product load line $T_3$ minus the corresponding value of torque on said speed versus torque curve $T_2$ is greater than zero.

8. The drive system of claim 7, wherein said motor operates according to said speed versus torque curves such that for any positive value of speed, the corresponding value of torque on said load line $T_3$ minus the corresponding value of torque on said speed versus torque curve $T_2$ is greater than zero, the speed versus torque curve $T_2$ having negative torque values for positive speed values.

9. The drive system of claim 7, wherein said motor has a run winding and an auxiliary winding and a ratio of turns of said run winding to said auxiliary windings is approximately 1.0.

10. The drive system of claim 7, wherein the motor has a low inertia rotor having a predetermined small diameter and a predetermined long length.

11. The drive system of claim 7, wherein said motor has a predetermined number of poles (P) and at least first and second windings which are located approximately 360°/P electrical degrees apart and 360°/2P mechanical degrees apart.

12. The drive system of claim 7, wherein the motor has at least first and second windings and a ratio of turns of said first and second windings is approximately 1.04.

13. The drive system of claim 7, wherein on said graph, said speed versus torque curve $T_2$ is substantially an inverted mirror image of said speed versus torque curve $T_1$.

14. The drive system of claim 7, where said speed versus torque curve $T_2$ has substantially negative values of torque for all positive values of angular speed of said motor.

15. The drive system of claim 7, wherein said motor has a capacitive reactance which is in the range 1.25 to 1.75 times a main winding open circuit reactance.

16. A reversing drive system comprising:
a load adapted to be rotatably driven, said load having a predetermined load line $T_3$ representing a steady state torque the load exerts in resistance to being rotated at various angular speeds;
a continuously reversing permanent split capacitor motor interconnected with said load to rotatably drive said load, said motor operable in a first direction according to a predetermined first curve $T_1$ representing torque versus angular speed and in a second direction according to a predetermined second curve $T_2$ such that said line $T_3$ intersects said first curve $T_1$ in a first quadrant of a two dimensional graph whose horizontal axis is torque and whose vertical axis is angular speed, said first quadrant characterized by positive values of torque and speed and further such that said line $T_3$ does not intersect said second curve $T_2$ in the first quadrant, whereby operating said motor in said first direction drives said load to accelerate until said line $T_3$ intersects with said first curve $T_1$ in said first quadrant and subsequently operating said motor in said second direction decelerates said load and reverse the direction of rotation of said load, said motor comprising: a rotor, a stator having a predetermined bore diameter and a predetermined outer diameter such that a stator ratio defined as said bore diameter divided by said outer diameter of said stator is about 0.43, a stator run winding line having a stator run winding with a first predetermined number of turns coupled in series with a first switch, and a stator auxiliary winding line coupled in parallel to said stator run winding line and having a stator auxiliary winding with a second predetermined number of turns coupled in series with a second switch, said first and second predetermined numbers of turns being approximately equal.

17. The reversing drive system of claim 16, further comprising a control means operably connected to said motor to operate said motor in said first and second directions.

18. The reversing drive system of claim 16, wherein said second curve $T_2$ has substantially negative torque values for substantially all positive values of angular speed of said rotor.

19. The reversing drive system of claim 16, wherein said motor has a capacitive reactance which is in the range 1.25 to 1.75 times a main winding open circuit reactance.

20. The reversing drive system of claim 16, wherein a winding ratio is about 1.04.

21. The reversing drive system of claim 16, wherein said permanent split capacitor motor has a first torque/speed curve for one direction of rotation of said rotor and a second torque/speed curve for an opposite direction of rotation of said rotor, said first torque/speed curve being substantially an inverted mirror image of said second torque/speed curve.

22. The motor of claim 23, wherein said first curve $T_1$ lies substantially only in the first quadrant and a fourth quadrant of a graph whose horizontal axis is a plot of torque values and whose vertical axis is a plot of correspondingly angular speed values, and said second curve $T_2$ lies in substantially a second quadrant and third quadrant of said graph.

23. The motor of claim 16, wherein operation of said permanent split capacitor motor is characterized by said load line that intersects only said first curve $T_1$ in said first quadrant, and for all positive values of speed, a corresponding torque value of the load line less a corresponding torque value of said second curve $T_2$ is always greater than zero.

24. The reversing drive system of claim 16, wherein said motor has said run winding and said auxiliary winding and a ratio of turns of said run winding to said auxiliary winding is approximately 1.0.

25. The reversing drive system of claim 16, wherein the motor has a low inertia rotor having a predetermined small diameter and a predetermined long length.

26. A continuously reversible permanent split capacitor motor comprising a rotor, a stator having a predetermined bore diameter and a predetermined outer diameter such that a stator ratio defined as bore diameter divided by said outer diameter of said stator is about 0.43, a stator run winding line having a first predetermined number of turns coupled in series with a first switch, and a stator auxiliary winding line coupled in parallel to said stator run winding line and having a stator auxiliary winding with a second predetermined number of turns coupled in series with a second switch, said first and second numbers of turns being approximately equal, said motor operating according to a speed versus torque curve $T_1$ on a two-dimensional graph whose horizontal axis comprises torque values and whose vertical axis comprises angular speed values, for a first direction of rotation and a speed versus torque curve $T_2$ for a second direction of rotation such that curve $T_2$ lies in a second quadrant for all negative values of angular speed of the rotor, said second quadrant characterized by negative values of torque and positive values of speed.

27. The motor of claim 26, wherein said speed versus torque curve $T_2$ is substantially an inverted mirror image of said speed versus torque curve $T_1$ on said graph.

28. The motor of claim 26, wherein said motor has a capacitive reactance which is in a range 1.25 to 1.75 times a main winding open circuit reactance.

29. The motor of claim 26, wherein a winding ratio of run and auxiliary windings is about 1.04.

* * * * *